United States Patent
Reymond et al.

(10) Patent No.: US 9,481,603 B2
(45) Date of Patent: Nov. 1, 2016

(54) THIN FILM DEPOSITION METHOD AND RESULTING PRODUCT

(75) Inventors: Vincent Reymond, Antony (FR); Andriy Kharchenko, Palaiseau (FR); Nicolas Nadaud, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 1240 days.

(21) Appl. No.: 13/376,983

(22) PCT Filed: Jun. 11, 2010

(86) PCT No.: PCT/FR2010/051172
§ 371 (c)(1),
(2), (4) Date: Dec. 8, 2011

(87) PCT Pub. No.: WO2010/142926
PCT Pub. Date: Dec. 16, 2010

(65) Prior Publication Data
US 2012/0087005 A1    Apr. 12, 2012

(30) Foreign Application Priority Data

Jun. 12, 2009    (FR) ..................... 09 53956

(51) Int. Cl.
*C03C 17/36*    (2006.01)
*C03C 23/00*    (2006.01)

(52) U.S. Cl.
CPC ............. *C03C 17/36* (2013.01); *C03C 17/366* (2013.01); *C03C 17/3613* (2013.01); *C03C 17/3626* (2013.01); *C03C 17/3639* (2013.01); *C03C 17/3644* (2013.01); *C03C 17/3681* (2013.01); *C03C 23/007* (2013.01); *C03C 23/0025* (2013.01)

(58) Field of Classification Search
CPC ....... G02B 5/20–5/289; G02B 27/14–27/149; C23C 14/28; C23C 24/08–24/087; C23C 24/10–24/106; C03C 2218/30; C03C 17/36–17/3697; C03C 23/00–23/0095
USPC ......... 359/577–590, 350–361; 427/123–125, 427/508, 553–554, 585–586, 595–596, 904
See application file for complete search history.

(56) References Cited

U.S. PATENT DOCUMENTS

| | | | |
|---|---|---|---|
| 5,935,702 A | 8/1999 | Macquart et al. | |
| 7,063,896 B2 * | 6/2006 | Mucklich ................. | C22F 3/00 148/525 |
| 7,648,741 B2 * | 1/2010 | Nguyen ................. | H05K 3/046 427/595 |
| 2005/0123772 A1 | 6/2005 | Coustet et al. | |
| 2005/0247555 A1 | 11/2005 | Thiel | |
| 2008/0007852 A1 * | 1/2008 | Kawasaki .............. | B82Y 20/00 359/884 |
| 2008/0311389 A1 | 12/2008 | Roquiny et al. | |
| 2009/0130409 A1 * | 5/2009 | Reutler ............. | B32B 17/10018 428/216 |
| 2010/0071810 A1 | 3/2010 | Nadaud et al. | |
| 2011/0117293 A1 * | 5/2011 | Durandeau ......... | C03C 17/2456 427/559 |

FOREIGN PATENT DOCUMENTS

| | | |
|---|---|---|
| EP | 0 718 250 | 6/1996 |
| JP | 2008-540311 A | 11/2008 |
| WO | 02 48065 | 6/2002 |
| WO | 03 093186 | 11/2003 |
| WO | 2005 070841 | 8/2005 |
| WO | 2007 101963 | 9/2007 |
| WO | 2008 096089 | 8/2008 |

OTHER PUBLICATIONS

International Search Report issued Sep. 9, 2010 in PCT/FR10/051172 filed on Jun. 11, 2010.
U.S. Appl. No. 13/496,090, filed Mar. 14, 2012, Kharchenko, et al.

* cited by examiner

*Primary Examiner* — Bumsuk Won
*Assistant Examiner* — Jeffrey Madonna
(74) *Attorney, Agent, or Firm* — Oblon, McClelland, Maier & Neustadt, L.L.P.

(57) ABSTRACT

A process for producing a substrate coated on a face with a low-E thin film multilayer, the process including: depositing a thin-film multilayer containing a thin silver film between at least two thin dielectric films and an absorbent film on a face a substrate; and heat treating the coated face with laser radiation between 500 and 2000 nm to reduce at least one selected from the group of the emissivity and the sheet resistance of the multilayer by at least 5%, wherein the absorbent film at least partially absorbs the laser radiation so that the absorption of the multilayer the wavelength of the laser radiation is such that the absorption of a clear glass substrate 4 mm in thickness coated with the multilayer at the wavelength of the laser radiation is greater than or equal to 10%.

16 Claims, No Drawings

THIN FILM DEPOSITION METHOD AND RESULTING PRODUCT

The invention relates to the field of inorganic thin films deposited especially on substrates.

Many thin films are deposited on substrates, especially substrates made of flat or slightly curved glass, so as to give materials obtained particular properties: optical properties, for example the reflection or absorption of radiation in a given wavelength range; particular electrical conduction properties; or properties associated with cleanability or the possibility of forming a self-cleaning material.

These thin films are usually based on inorganic compounds: oxides, nitrides or even metals. Their thickness generally varies from a few nanometers to a few hundred nanometers, hence the term "thin".

Among the most interesting are thin films based on metallic silver, which have electrical conduction and infrared radiation reflection properties, hence their use in solar-control glazing, especially antisolar glazing (with the aim of reducing the amount of incoming solar energy) and/or low-E (low emissivity) glazing (with the aim of reducing the amount of energy dissipated to the outside of a building or a vehicle).

In particular to prevent oxidation of the silver and to attenuate its reflection properties in the visible, the or each silver film is generally inserted in a multilayer. In the case of solar-control or low-E glazing, the or each thin silver-based film is generally placed between two thin dielectric films based on an oxide or nitride (for example $SnO_2$ or $Si_3N_4$). A very thin film may also be placed beneath the silver film so as to promote the wetting and nucleation of the silver (for example a zinc oxide ZnO film) and a second very thin film (a sacrificial film, for example made of titanium) may also be placed over the silver film, said second film being intended to protect the silver film if the deposition of the subsequent film is carried out in an oxidizing atmosphere or in the case of heat treatments resulting in oxygen migration into the multilayer. These films are called a wetting film and a blocker film respectively. The multilayers may also comprise several silver films.

The silver films have the particular feature of seeing some of their properties improved when they are in an at least partially crystalline state. It is generally sought to maximize the degree of crystallization of these films (i.e. the proportion of crystalline material by weight or by volume) and the size of the crystalline grains (or the size of the coherent diffraction domains measured by X-ray diffraction methods).

In particular, it is known that silver films having a high degree of crystallization, and consequently a low residual content of amorphous silver, have a lower emissivity, a lower resistivity and a higher transmission in the visible than predominantly amorphous silver films. The electrical conductivity and the low-E properties of these films are thus improved. The increase in grain size is in fact accompanied by a reduction in grain boundaries, promoting mobility of the electrical charge carriers.

One process widely employed on an industrial scale for thin-film deposition, especially on a glass substrate, is magnetically enhanced sputtering, called hereafter magnetron sputtering. In this process, a plasma is created in a high vacuum close to a target comprising the chemical elements to be deposited. The active species of the plasma, by bombarding the target, tear off said elements, which are deposited on the substrate forming the desired thin film. This process is called a "reactive" process when the film is made of a material resulting from a chemical reaction between the elements torn off from the target and the gas contained in the plasma. The major advantage of this process lies in the possibility of depositing a very complex multilayer on one and the same line by making the substrate run in succession beneath various targets, generally in one and the same device.

When implementing the magnetron process on an industrial scale, the substrate remains at ambient temperature or is heated to a moderate temperature (less than 80° C.), particularly when the run speed of the substrate is high (which is generally desirable for economic reasons). What may appear to be an advantage constitutes however a drawback in the case of the aforementioned films, since the low temperatures involved generally preclude sufficient crystalline growth. This is most particularly the case for thin films of small thickness and/or films made of materials having a very high melting point. The films obtained using this process are therefore predominantly or even completely amorphous or nanocrystalline (the average crystalline grain size being less than a few nanometers) and heat treatments prove to be necessary in order to obtain the desired degree of crystallization and the desired grain size.

Possible heat treatments consist in heating the substrate either during deposition or after deposition, on leaving the magnetron line. Most usually, temperatures of at least 200° C. or 300° C. are necessary. This is because the crystallization is better and the grain size is larger the closer the substrate temperature to the melting point of the material constituting the thin film.

However, heating the substrate in industrial magnetron lines (during deposition) has proved to be difficult to implement, in particular since heat transfer in a vacuum, which is necessarily radiative in nature, is difficult to control and incurs a high cost in the case of large substrates measuring several meters in width. In the case of thin glass substrates, this type of treatment often entails a high risk of breakage. Furthermore, the silver films deposited on a hot substrate tend to form discontinuous films, in the form of islands, the resistivity of which is high.

Heating the coated substrate after deposition, for example by placing the substrate in a furnace or oven, or subjecting the substrate to infrared radiation from conventional heaters such as infrared lamps, also has drawbacks since these various processes have no distinction between heating the substrate and heating the thin film. Heating the substrate to temperatures above 150° C. is liable to cause breakages in the case of large substrates (measuring several meters in width) as it is impossible to ensure the same temperature over the entire width of the substrate. Heating the substrates also slows down the entire process, as it is necessary to wait until they have completely cooled before considering cutting them or storing them—the substrates are generally stored one on top of another. Highly controlled cooling is also essential in order to prevent stress generation within the glass, and therefore the possibility of breakages. Since such highly controlled cooling is very expensive, the annealing is generally not sufficiently controlled to eliminate thermal stresses within the glass, thereby generating an increased number of in-line breakages. The annealing also has the advantage of making it more difficult to cut the glass, cracks having a greater tendency to propagate linearly.

If the glazing is bent and/or tempered, the coated substrates are heated, by heating the glass above its softening point (generally above 600° C., or even 700° C., for a few minutes). The tempering or bending operation therefore makes it possible to obtain the desired thin-film crystallization result. However, it would be expensive for glazing to undergo such treatments with the sole purpose of improving the crystallization of the film. Furthermore, tempered glazing can no longer be cut, and certain thin-film multilayers cannot withstand the high temperatures undergone during the tempering of the glass.

Patent application WO 2008/096089, filed by the Applicant, describes a rapid annealing process that consists in delivering an extremely high power per unit area to the film. The film is heated extremely rapidly, without the heat having time to diffuse into the substrate. It is thus possible for the thin film to be heat treated without significantly heating the substrate, thereby limiting the risk of breakage due to the thermal shock. In the case of silver-based films, the envisaged processes are processes involving a laser emitting infrared radiation, induction, a plasma torch or the action of a flame. These processes make it possible to achieve resistivities that previously could not be reached except by tempering the glass.

One object of the invention is to provide an improved process for achieving even lower resistivities and obviating the abovementioned problems, while still maintaining a high light transmission. Another object of the invention is to provide a more economic process, especially for treating large substrates more rapidly and/or for using lower-power laser devices.

For this purpose, one subject of the invention is a process for obtaining a substrate coated on at least one face with a low-E thin-film multilayer, comprising the following steps:
- a thin-film multilayer comprising at least one thin silver film between at least two thin dielectric films is deposited on said at least one face of said substrate; and
- the at least one coated face is heat treated using at least one source of laser radiation emitting in at least one wavelength between 500 and 2000 nm so that the emissivity and/or the sheet resistance of the multilayer is reduced by at least 5%.

According to the invention, the multilayer before treatment includes at least one thin film at least partially absorbing the laser radiation so that the absorption of said multilayer at least one wavelength of the laser radiation is such that the absorption of a clear glass substrate 4 mm in thickness coated with said multilayer at said at least one wavelength of the laser radiation is greater than or equal to 10%.

The absorption of a substrate coated with the multilayer at a given wavelength is defined as 100% minus the transmission of the coated substrate at the same wavelength and minus the reflection of the same coated substrate at the same wavelength on the multilayer side.

The term "clear glass" is understood to mean a soda-lime-silica glass obtained by the float process, not coated with films, and having a light transmission of around 90%, a light reflection of around 8% and an energy transmission of around 83% for a thickness of 4 mm. The light transmission, light reflection and energy transmission are such as defined by the NF EN 410 standard. Typical clear glasses are for example those sold under the name SGG Planilux by Saint-Gobain Glass France or under the name Planibel Clair by AGC Flat Glass Europe. These substrates are conventionally used to manufacture low-E glazing.

The process according to the invention is of course not limited to coatings deposited on a clear glass substrate or on a substrate 4 mm in thickness. The coating may be deposited on any type of substrate, but the absorption of the multilayer must be such that if it had been deposited on a clear glass substrate with a thickness of 4 mm, the absorption of this substrate coated with the multilayer would be as claimed.

The process according to the invention makes it possible to deliver sufficient energy to promote crystallization of the thin silver film by a physico-chemical crystalline growth mechanism around seeds already present in the film, while still remaining in the solid phase. The promotion of crystallization of the silver film may especially result in any residues of amorphous phase disappearing and/or the size of the coherent diffraction domains increasing and/or the density of point defects (vacancies or interstitials) or surface or bulk defects, such as twins, decreasing.

The process according to the invention has the advantage of heating only the low-E multilayer, without significantly heating the entire substrate. It is thus no longer necessary for the substrate to undergo slow controlled cooling before the glass is cut or stored. This process also makes it possible to integrate a heater on existing continuous production lines, more particularly in the space located between the outlet of the vacuum deposition chamber of the magnetron line and the device for storing the glass in stacked form. It is also possible in certain cases to carry out the treatment according to the invention within the actual vacuum deposition chamber.

The use of laser radiation has the advantage of obtaining temperatures generally below 100° C. and even often below 50° C. on the opposite side from the first face of the substrate (i.e. on the uncoated face). This particularly advantageous feature is due to the fact that the heat exchange coefficient is very high, typically greater than 400 W/(m²·s). The surface power of the laser radiation on the multilayer to be treated is even preferably greater than or equal to 20 or 30 kW/cm².

This very high energy density makes it possible to achieve the desired temperature in the multilayer extremely rapidly (in general, in a time of 1 second or less) and consequently to correspondingly limit the duration of the treatment, the heat generated then not having the time to diffuse into the substrate. Thus, each point in the multilayer is preferably subjected to the treatment according to the invention (and especially heated to a temperature of greater than or equal to 300° C.) for a time generally of less than or equal to 1 second, or even 0.5 seconds. In contrast, the infrared lamps conventionally used (with no radiation focusing device) are unable to achieve these high power levels per unit area, the treatment time has to be longer to reach the desired temperatures (often lasting several seconds) and the substrate is therefore necessarily heated to high temperatures due to diffusion of the heat, even if the wavelength of the radiation is adapted so as to be absorbed by the thin film and not by the substrate.

By virtue of the very high heat exchange coefficient associated with the process according to the invention, that part of the glass lying 0.5 mm from the thin film is generally not exposed to temperatures above 100° C. The temperature of that face of the substrate on the opposite side from the face treated by the at least one source of laser radiation preferably does not exceed 100° C., especially 50° C. and even 30° C. during the heat treatment.

Most of the energy delivered is therefore "used" by the multilayer so as to improve the crystallization characteristics of the or each silver film that it contains.

The process according to the invention is also improved by the presence in the multilayer before treatment of at least one thin film absorbing the laser radiation sufficiently so that the absorption at least one wavelength of the laser radiation of a clear glass substrate 4 mm in thickness and coated with the multilayer is greater than or equal to 10%. The multilayer before treatment may comprise one or more of these films that are termed in the rest of the text "absorbent" films. The multilayer may for example comprise one absorbent film or else two or three or four, and even five or six, absorbent films. Whatever the number of absorbent films, the important point is that the absorption of the multilayer at the laser wavelength is as claimed. When at least one absorbent film is present, this considerably enhances the effect of the laser treatment: the energy absorbed by the absorbent film is in fact re-emitted close to the silver film, increasing the local temperature at this film. The resulting increase in effectiveness of the laser treatment then helps to improve the emissivity properties of the final multilayer and/or accelerate the treatment and/or use a lower-power and therefore less expensive laser.

To increase the effectiveness of the laser treatment further, the absorption of the multilayer is such that the absorption of a clear glass substrate 4 mm in thickness coated with the multilayer is, before laser treatment, preferably greater than or equal to 12%, or even 13% or 15%, and even 20% or 25% or even 30% at least one wavelength of the laser radiation.

The degree of crystallization obtained using the process according to the invention is preferably greater than or equal to 20% or 50%, especially 70% and even 90%. This degree of crystallization, defined as being the mass of crystalline material divided by the total mass of material, may be determined by x-ray diffraction using the Rietveld method. Because of the crystallization mechanism through the growth of crystalline grains starting from seeds or nuclei, the increase in the degree of crystallization is generally accompanied by an increase in the size of the crystalline grains or coherent diffraction domains measured by x-ray diffraction.

The improvement in crystallization characteristics also makes it possible to increase the light transmission of the coated substrate by at least 5%, especially 10%, in absolute value, or even 15% and even 20%, again in absolute value (not a relative increase). The light transmission is calculated according to NF EN 410 standard.

Preferably, the sheet resistance and/or the emissivity of the multilayer is reduced by at least 10%, or 15% or even 20% by the heat treatment. Here, this is a relative decrease, with respect to the emissivity or sheet resistance value before treatment.

According to a preferred embodiment, the multilayer comprises at least two silver films, the absorption of said multilayer at least one wavelength of the laser radiation is such that the absorption of a clear glass substrate 4 mm in thickness coated with said multilayer at said at least one wavelength of the laser radiation is greater than or equal to 11% and the heat treatment is such that the selectivity of the multilayer is increased by at least 1%, especially 2%, in relative magnitude. The selectivity is defined as being the ratio of the light transmission to the solar factor.

These two quantities are calculated according to the NF EN 410 standard on a double glazing unit comprising two clear glass substrates 6 mm in thickness flanking a 15 mm thick cavity containing 90 argon, in which the multilayer is on face 2, that is to say on that face of the substrate in contact with the outside of the building which is on the opposite side to the face turned toward the outside (the latter being termed face 1).

Another advantage of the invention lies in the fact that the process makes the thin-film multilayer, but not the substrate, undergo the equivalent of a tempering operation. It turns out that the optical (colorimetric coordinates, light transmission or energy transmission) properties of certain thin-film multilayers are modified when the glass is tempered. The process according to the invention therefore makes it possible to obtain an untempered glass (and therefore one not having within it a stress profile specific to tempered glass, making it cuttable) but having substantially the same optical properties as if it had been tempered. The process according to the invention also obviates certain drawbacks due to tempering, especially the esthetic aspect of the multilayer (appearance of haze, etc.). If the coated substrate treated according to the invention were to be tempered, its optical properties would no longer be affected by the tempering. The treatment according to the invention therefore offers another advantage, namely that of providing multilayers (especially those comprising two or three silver films) having the same optical properties in the tempered state as in the untempered state. It then becomes possible to combine, on one and the same wall, untempered glazing panels and tempered glazing panels, comprising basically the same multilayer but nevertheless having the same esthetic appearance. Before the tempering, the tempered glazing may or may not have been pretreated according to the invention. It is thus possible to combine, on one and the same wall, glazing panels comprising the same basic multilayer but having undergone three different treatments: a tempering treatment; a heat treatment according to the invention; or a heat treatment according to the invention followed by a tempering treatment.

Thus, the process is preferably such that the parameter $\Delta E^*$ between the coated substrate treated according to the invention and the coated substrate untreated according to the invention but tempered is less than or equal to 2.0, especially 1.5. Alternatively, or additionally, the process is preferably such that the parameter $\Delta E^*$ between the coated substrate treated according to the invention and then tempered and the coated substrate treated according to the invention but not tempered is less than or equal to 2.0, especially 1.5. As is known in the technical field, $\Delta E^* = \sqrt{(\Delta L^*)^2 + (\Delta a^*)^2 + (\Delta b^*)^2}$. The colorimetric coordinates L*, a* and b* are calculated under illuminant $D_{65}$ and using the CIE-1931 reference observer. These are colorimetric coordinates in reflection, either on the multilayer side or on the substrate side, that is to say on the opposite side to that with the multilayer. The term $\Delta L^*$ denotes the change in the coordinate L* between the two states in question. The same convention applies to the terms $\Delta a^*$ and $\Delta b^*$. Preferably, the multilayer comprises at least two silver films, especially two or three silver films, since none of such multilayers currently known can be tempered, which means that the colorimetric properties of all such multilayers vary because of the tempering. For the first time, the process according to the invention makes it possible to obtain a temperable multilayer comprising at least two or three silver films.

To obtain even lower resistivity and emissivity values, the substrate may undergo a tempering step after the heat treatment step according to the invention. The thermal tempering will generally be carried out after the glass has been cut to the desired final dimensions.

It may be beneficial to vary the power of the laser for the purpose of maintaining minimum absorption after the treatment according to the invention, so that after any subsequent tempering the coating does not have defects of the haze or corrosion type.

The substrate is preferably made of glass or a polymeric organic substance. It is preferably transparent and colorless (it is then either a clear or extra-clear glass) or colored, for example blue, gray or bronze. The glass is preferably of the soda-lime-silica type, but it may also be a glass of the borosilicate or aluminoborosilicate type. The preferred polymeric organic substances are polycarbonate or polymethylmethacrylate or polyethylene terephthalate (PET). Advantageously, the substrate has at least one dimension greater than or equal to 1 m, or 2 m or even 3 m. The thickness of the substrate generally varies between 0.5 mm and 19 mm, preferably between 0.7 and 9 mm, especially between 2 and 8 mm or even between 4 and 6 mm. The substrate may be flat or bent, or even flexible.

The glass substrate is preferably of the float glass type, that is to say able to be obtained by a process consisting in casting molten glass onto a bath of molten tin (called a "float" bath). In this case, the film to be treated may equally well be deposited on the "tin" side as on the "atmosphere" side of the substrate. The terms "atmosphere" side and "tin" side are understood to mean those faces of the substrate that have been in contact with the atmosphere in the float bath and in contact with the molten tin respectively. The tin side contains a small surface amount of tin that has diffused into the structure of the glass. The substrate may also be obtained by rolling between two rollers, which technique makes it possible in particular to imprint features on the surface of the glass.

The low-E multilayer, before or after heat treatment, comprises at least one silver film between at least two dielectric films. There is at least one absorbent film in the multilayer. In the following text, the preferred architecture of the multilayers treated according to the invention will firstly be described, before going into detail about the positioning of the or each absorbent film within such an architecture. Unless indicated otherwise, the thicknesses given are physical thicknesses.

The low-E multilayer, before or after heat treatment, preferably comprises, starting from the substrate, a first coating comprising at least a first dielectric film, at least a silver film, optionally an overblocker film and a second coating comprising at least a second dielectric film.

Preferably, the physical thickness of the or each silver film is between 6 and 20 nm.

The overblocker film is intended to protect the silver film during deposition of a subsequent film (for example if this is deposited in an oxidizing or nitriding atmosphere) and during any heat treatment of the tempering or bending type.

The silver layer may also be deposited on and in contact with an underblocker film. The multilayer may therefore comprise an overblocker film and/or an underblocker film flanking the or each silver film.

Blocker (underblocker and/or overblocker) films are generally based on a metal chosen from nickel, chromium, titanium, niobium or an alloy of these various metals. Mention may in particular be made of nickel-titanium alloys (especially those containing about 50% of each metal by weight) and nickel-chromium alloys (especially those containing 80% nickel by weight and 20% chromium by weight). The overblocker film may also consist of several superposed films; for example, on moving away from the substrate, a titanium film and then a nickel alloy (especially a nickel-chromium alloy) film, or vice versa. The various metals or alloys cited may also be partially oxidized, and may especially be oxygen substoichiometric (for example $TiO_x$ or $NiCrO_x$).

These blocker (underblocker and/or overblocker) films are very thin, normally having a thickness of less than 1 nm, so as not to affect the light transmission of the multilayer, and can be partially oxidized during the heat treatment according to the invention. As indicated in the rest of the text, the thickness of at least one blocker film may be higher, so as to constitute an absorbent film according to the invention. In general, the blocker films are sacrificial films capable of capturing oxygen coming from the atmosphere or from the substrate, thus preventing the silver film from oxidizing.

The first and/or the second dielectric film is typically an oxide (especially tin oxide), or preferably a nitride, especially silicon nitride (in particular in the case of the second dielectric film, the one further away from the substrate). In general, the silicon nitride may be doped, for example with aluminum or boron, so as to make it easier to deposit it by sputtering techniques. The degree of doping (corresponding to the atomic percentage relative to the amount of silicon) generally does not exceed 2 at %. The function of these dielectric films is to protect the silver film from chemical or mechanical attack and they also influence the optical properties, especially in reflection, of the multilayer, through interference phenomena.

The first coating may comprise one dielectric film or a plurality, typically 2 to 4, of dielectric films. The second coating may comprise one dielectric film or a plurality, typically 2 to 3, of dielectric films. These dielectric films are preferably made of a material chosen from silicon nitride, titanium oxide, tin oxide and zinc oxide, or any of their mixtures or solid solutions, for example a tin zinc oxide, or a titanium zinc oxide. The physical thickness of the dielectric film, or the overall physical thickness of all the dielectric films, whether in the first coating or in the second coating, is preferably between 15 and 60 nm, especially between 20 and 50 nm.

The first coating preferably comprises, immediately beneath the silver film or beneath the optional underblocker film, a wetting film, the function of which is to increase the wetting and bonding of the silver film. Zinc oxide, especially when doped with aluminum, proves to be particularly advantageous in this regard.

The first coating may also contain, directly beneath the wetting film, a smoothing film, which is a partially or completely amorphous mixed oxide (and therefore one having a very low roughness), the function of which is to promote growth of the wetting film in a preferential crystallographic orientation, thereby promoting silver crystallization through epitaxial phenomena. The smoothing film is preferably composed of a mixed oxide of at least two metals chosen from Sn, Zn, In, Ga and Sb. A preferred oxide is antimony-doped indium tin oxide.

In the first coating, the wetting film or the optional smoothing film is preferably deposited directly on the first dielectric film. The first dielectric film is preferably deposited directly on the substrate. For optimally adapting the optical properties (especially the appearance in reflection) of the multilayer, the first dielectric layer may as an alternative be deposited on another oxide or nitride film, for example a titanium oxide film.

Within the second coating, the second dielectric film may be deposited directly on the silver film or preferably on an overblocker, or else on other oxide or nitride films intended for adapting the optical properties of the multilayer. For example, a zinc oxide film, especially one doped with aluminum, or a tin oxide film, may be placed between an overblocker and the second dielectric film, which is preferably made of silicon nitride. Zinc oxide, especially aluminum-doped zinc oxide, helps to improve the adhesion between the silver and the upper films.

Thus, the multilayer treated according to the invention preferably comprises at least one ZnO/Ag/ZnO succession.

The zinc oxide may be doped with aluminum. An underblocker film may be placed between the silver film and the subjacent film. Alternatively or additionally, an overblocker film may be placed between the silver film and the superjacent film.

Finally, the second coating may be surmounted by a film referred to as an overcoat. This last film of the multilayer, which is therefore the one in contact with the ambient air, is intended to protect the multilayer from any mechanical attack (scratches, etc.) or chemical attack. This overcoat is generally very thin so as not to disturb the appearance in reflection of the multilayer (its thickness is typically between 1 and 5 nm). It is preferably based on titanium oxide or a mixed tin zinc oxide, especially one doped with antimony, deposited in substoichiometric form. As indicated below, the composition of this overcoat may be chosen so that it is the absorbent film or an absorbent film of the multilayer.

The multilayer may comprise one or more silver films, especially two or three silver films. Where more than one silver film is present, the general architecture presented above may be repeated. In this case, the second coating relating to a given silver film (and therefore located above this silver film) generally coincides with the first coating relating to the next silver film.

The multilayer before heat treatment comprises at least one absorbent film. A thin absorbent film may be in direct contact with the silver film so as to improve the transfer of energy re-emitted toward the silver film. A thin absorbent film may especially be located beneath the silver film (i.e. closer to the substrate) and/or on top of the silver film.

According to a first preferred embodiment, a thin film at least partially absorbing the laser radiation is a metallic film which is deposited directly on top of the silver film (the overblocker film) or directly beneath the silver film (the underblocker film), and the thickness of which is between 2 and 5 nm, especially between 3 and 5 nm. This blocker film is partially oxidized during the laser treatment, creating a generally oxygen-substoichiometric oxide having a reduced light absorption. Thinner films do not have sufficient absorption for energy transfer to the silver film to be perceptible. Furthermore, thinner films have a tendency to be completely oxidized during the laser treatment, resulting in poor mechanical strength of the final multilayer. The thickness range described, unusual because it is larger than the typical thickness of blocker films, is therefore particularly well suited to the treatment according to the invention. As regards the chemical nature of the blocker films, what is described above also applies to the case in which the blocker film is an absorbent film according to the invention.

According to a second preferred embodiment, a thin film at least partially absorbing the laser radiation is a nitride film, especially one that is stoichiometric or nitrogen-substoichiometric. Preferably, the stoichiometric nitride is chosen from niobium nitride, titanium nitride or any mixture thereof, which have high absorptions in the wavelength range of the laser. The nitrogen-substoichiometric nitride is preferably chosen from substoichiometric silicon, aluminum, titanium or niobium nitrides, or any of their mixtures. If required, especially if the treated multilayer has to retain a solar control function, the absorbent nitride may be protected from oxidation by encapsulating it between two transparent nitride films, such as silicon nitride films. This multilayer of three superposed nitride films may be placed just as well beneath the silver film as on the silver film. In the general architecture presented above, the absorbent nitride film may just as well form part of the first coating as part of the second coating. When it is encapsulated, the multilayer that has three nitride films preferably replaces the first dielectric film and/or the second dielectric film, especially when they are made of silicon nitride. However, it has been observed that, during the treatment according to the invention, the absorbent nitride film, even if not encapsulated, does not oxidize, in particular in the case of niobium nitride, which is particularly stable. Preferably, the absorbent nitride film has a thickness of between 2 and 10 nm, especially between 2 and 5 nm.

According to a third preferred embodiment, a thin film at least partially absorbing the laser radiation is a film in contact with the air and consisting of a metal, an oxygen-substoichiometric metal oxide or a metal nitride. In the context of the general architecture presented above, this is therefore the overcoat. This overcoat, in contact with the air, and therefore the last film of the multilayer, generally oxidizes during the laser treatment, so that its light absorption after treatment will be very low. In certain cases, especially as regards niobium nitride, the overcoat does not oxidize and therefore retains an appreciable light absorption after treatment, which may be advantageous if the multilayer has to have a solar control function. The thickness of this overcoat in contact with the air is preferably less than or equal to 5 nm or less than or equal to 3 nm, but greater than or equal to 1 nm. A thickness as small as this is generally sufficient to obtain the desired absorption. A small thickness also allows complete oxidation after the treatment according to the invention and therefore results in high light transmissions. The metal is preferably chosen from silicon, niobium, titanium, aluminum, zinc, tin and zirconium, or any of their alloys. Preferably, the oxygen-substoichiometric oxide is a silicon, niobium, titanium, aluminum, zinc, tin or zirconium oxide or any of their mixtures. The nitride may be stoichiometric, and in this case it is preferably a niobium nitride, a titanium nitride or a mixture thereof. The nitride may also be substoichiometric: it may then be a silicon, aluminum, titanium, niobium, zinc, tin or zirconium nitride, or any of their mixtures.

According to a fourth preferred embodiment, a thin film at least partially absorbing the laser radiation is a film of an oxygen-substoichiometric metal oxide, located beneath and preferably in contact with the or each silver film and/or located on and preferably in contact with the or each silver film. In particular, it may be a wetting film, as defined above. The oxygen-substoichiometric oxide is preferably chosen from zinc oxide, titanium oxide and tin oxide, or one of their mixtures.

According to a fifth preferred embodiment, a thin film at least partially absorbing the laser radiation is a carbon-based film in contact with the air. Preferably, the carbon is of the graphite or amorphous type and/or contains at least 50% or even 100% sp2 carbon. The thin carbon-based film preferably consists of carbon but may however be doped with a metal or may be partially hydrogenated. The thickness of the carbon film is preferably less than 5 nm, especially 2 nm and even 1 nm. Carbon has a high absorbent capacity in the visible and in the infrared. The carbon film, most particularly when it is predominantly sp2 hybridized carbon, especially of the graphite or amorphous type, is, more particularly when it has a small thickness, eliminated during the treatment, probably by being oxidized to carbon dioxide, which evaporates, so that the residual absorption after treatment is minimal. The thin carbon-based film may be obtained by various techniques, especially by magnetron sputtering, for example using a graphite target in an argon atmosphere.

Other deposition processes include CVD (chemical vapor deposition), arc deposition, evaporation deposition and sol-gel processes.

Whatever its position in the multilayer, the absorbent film or one such film may also be based on an oxide doped with at least one ion of a transition metal (for example, iron, chromium, vanadium, manganese, cobalt, nickel or copper) or of a rare earth (for example, neodymium or europium).

The treated multilayer may comprise a single absorbent film. It may also comprise more absorbent films, for example two, three, four or five such films, in particular if the presence of a single absorbent film is not sufficient to achieve the desired absorption of the overall multilayer. The multilayer may therefore be chosen so that it contains a plurality of absorbent films which, when combined, make it possible to achieve the desired absorption but which, individually, do not do so. This is particularly the case for multilayers comprising more than one silver film, especially two or three silver films: the increase in number of blockers (underblockers and/or overblockers) may result in a high absorption at the wavelength of the laser, whereas each of the films by itself does not have a thickness sufficient to achieve this absorption.

In order for the absorption of the laser radiation by the multilayer to be further improved, it may therefore comprise several types of absorbent films as described above. Each of the preferred embodiments that have been described may especially be combined with one or more other embodiments. In particular, the following preferred embodiments may be combined: 1 and 2; 1 and 3; 1 and 4; 1 and 5; 2 and 3; 2 and 4; 3 and 4; 2 and 5; 3 and 5; 1, 2 and 3; 1, 2 and 4; 1, 2 and 5; 1, 3 and 4; 1, 3 and 5; 2, 3 and 4; 2, 3 and 5; 3, 4 and 5; 1, 2, 3 and 4; 1, 2, 3 and 5; 1, 2, 4 and 5; 1, 3, 4 and 5; and 2, 3, 4 and 5. As an example, the multilayer may comprise one thickened 6 locker film (with a thickness between 2 and 5 nm) and one absorbent overcoat (a combination of the first and third preferred embodiments). Certain preferred embodiments may also be combined with themselves. This is so in the case of the second preferred embodiment, in the sense that the multilayer may comprise a plurality, for example two or three, of nitride absorbent films, especially encapsulated between two silicon nitride films. Likewise, the multilayer may comprise a plurality of blocker (underblocker and/or overblocker) films that have been thickened so as to increase their absorption of the laser radiation (combinations of the first embodiment).

A few nonlimiting examples of multilayers that can be treated according to the invention are described below. The films are indicated in the order of deposition starting from the substrate. Optional films are indicated in brackets.

Multilayer 1: $Si_3N_4/TiO_2/(SnZnO_x)/ZnO/Ag/Ti/ZnO/Si_3N_4/Ti$

Multilayer 2: $TiO_2/ZnO/Ag/ZnO/(TiO_2)/Si_3N_4/ZnSn$

Multilayer 3: $(Si_3N_4)/TiO_2/(NiCr)/Ag/NiCr/(ZnO)/SnO_2$

Multilayer 4: $Si_3N_4/NbN/Si_3N_4/(SnZnO_x)/ZnO/Ag/NiCr/ZnO/Si_3N_4/TiO_x$

Multilayer 5: $SiN_x/ZnO/Ag/NiCr/ZnO/Si_3N_4$

Multilayer 6: $Si_3N_4/ZnO/Ag/Ti/ZnO/Si_3N_4/ZnO/Ag/Ti/ZnO/Si_3N_4$

Multilayer 7: $Si_3N_4/ZnO/Ag/Ti/ZnO/Si_3N_4/ZnO/Ag/Ti/ZnO/Si_3N_4/ZnO/Ag/Ti/ZnO/Si_3N_4$ Multilayer 8: $Si_3N_4/TiO_2/(SnZnO_x)/ZnO/Ag/Ti/ZnO/Si_3N_4/C$.

In the case of multilayer 1, an absorbent film is formed by the metallic overcoat (made of titanium, although other metals are possible, as are substoichiometric nitrides or oxides, as mentioned above) and optionally by the overblocker (here made of titanium, although the metals or alloys mentioned above may be used) when it is thickened. This multilayer therefore illustrates the third preferred embodiment, optionally in combination with the first one.

Multilayer 2 comprises one absorbent film, which is a metallic overcoat made of an SnZn alloy. This multilayer therefore illustrates the third preferred embodiment. Of course, other alloys among those described above are possible.

Multilayer 3 comprises one overblocker and one underblocker, both made of a nickel-chromium alloy. One or both of these blockers may be thickened so as to constitute one or two absorbent film(s). For example, only the underblocker or only the overblocker may be thickened (first preferred embodiment). Alternatively, both blockers may be thickened (first preferred embodiment combined with itself).

Multilayer 4 comprises a niobium nitride absorbent film and an oxygen-substoichiometric titanium oxide absorbent overcoat. It therefore illustrates a combination of the second and third preferred embodiments. The overblocker made of a nickel-chromium alloy may also be thickened so as to constitute an absorbent film (first preferred embodiment). This type of multilayer has a solar control function in addition to a low-E function.

In multilayer 5, an absorbent film is a nitrogen-substoichiometric silicon nitride film (second preferred embodiment). The overblocker made of a nickel-chromium alloy may also be thickened so as to constitute an absorbent film (first preferred embodiment).

Multilayers 6 and 7 illustrate those containing two and three silver films respectively. In certain cases, the large number of blockers (here made of titanium, although other metals or alloys already mentioned can be used) may be sufficient to achieve the desired absorption. In other cases, it may prove necessary to thicken at least one blocker.

Multilayer 8 comprises, as last film, a carbon film, preferably of the amorphous or graphite type. This highly absorbent film is removed by oxidation during the heat treatment. A metallic film, for example made of titanium, may be located beneath and in contact with this carbon film.

In the multilayers presented above, at least one zinc oxide film may also be oxygen-substoichiometric and constitute an absorbent film illustrating the fourth preferred embodiment.

The treatment according to the invention is generally carried out using a source of radiation having a well-defined wavelength. However, the invention does not exclude the use of a number of different lasers so that the coated substrate experiences the action of a plurality of radiation sources having different wavelengths.

The wavelength of the radiation is preferably between 530 and 1000 nm, or between 600 and 1000 nm, especially between 700 and 950 nm, or even between 800 and 950 nm, since silver reflects this type of radiation less than infrared radiation of longer wavelength. The treatment is therefore more effective. Furthermore, the substrate, if it is made of clear glass, absorbs less in this wavelength range and is then less apt to undergo high temperatures.

The subject of the invention is also a process for obtaining a substrate coated on at least one face with a low-E thin-film multilayer, comprising the following steps:
  a thin-film multilayer comprising at least one thin silver film between at least two thin dielectric films is deposited on said at least one face of said substrate; and
  the at least one coated face is heat treated using at least one source of laser radiation emitting in at least one wavelength between 530 and 1000 nm, or between 600 and 1000 nm, especially between 700 and 950 nm, or even between 800 and 950 nm, so that the emissivity and/or the resistivity of the multilayer is reduced by at least 5%.

It is preferred to use laser diodes, for example emitting at a wavelength of around 808 nm, 880 nm, 915 nm or else 940 nm or 980 nm. In the form of systems of diodes, very high power levels may be obtained, possibly reaching surface power levels on the multilayer to be treated of greater than 20 kW/cm$^2$, or even 30 kW/cm$^2$.

For greater implementation simplicity, the lasers employed in the context of the invention may be fiberized, which means that the laser radiation is injected into an optical fiber and then delivered close to the surface to be treated via a focusing head. The laser may also be a fiber laser, in the sense that the amplifying medium is itself an optical fiber.

The laser beam may be a point laser beam, in which case it is necessary to provide a system for moving the laser beam in the plane of the substrate.

Preferably however, the laser radiation is emitted by at least one laser beam forming a line, called a "laser line" in the rest of the text, which simultaneously irradiates all or part of the width of the substrate. This embodiment is preferred as it avoids the use of expensive moving systems, which are generally bulky and difficult to maintain. The in-line laser beam may especially be obtained using systems of high-power laser diodes combined with focusing optics. The thickness of the line is preferably between 0.01 and 1 mm. The length of the line is typically between 5 mm and 1 m. The profile of the line may especially be a Gaussian curve or have a "top hat" configuration.

The laser line simultaneously irradiating all or part of the width of the substrate may be made up of a single line (in which case it irradiates the entire width of the substrate) or a plurality of optionally separate lines. When a plurality of lines is used, it is preferable for each line to be placed so that the entire area of the multilayer is treated. The or each line is preferably placed so as to be perpendicular to the run direction of the substrate or placed obliquely. The various lines may treat the substrate simultaneously or in a delayed manner. The important point is that the entire surface to be treated is treated.

To treat the entire surface of the film, it is preferable to employ a relative movement between, on the one hand, the substrate coated with the film and the or each laser line. The substrate may thus be moved, especially so as to run translationally past the stationary laser line, generally beneath it, but optionally above said laser line. This embodiment is particularly advantageous for a continuous treatment. Alternatively, the substrate may be stationary and the laser may be moved. Preferably, the difference between the respective speeds of the substrate and the laser is greater than or equal to 1 meter per minute, or 4 meters per minute or even 6, 8, 10 or 15 meters per minute, so as to ensure a high treatment rate. According to the invention, by judiciously choosing certain films of the multilayer it is possible to achieve a very great reduction in the resistivity for high run speeds and therefore high treatment rates.

When it is the substrate that is moving, especially translationally, it may be moved using any mechanical conveying means, for example belts, rollers or trays running translationally. The conveying system is used to control and regulate the run speed. If the substrate is made of a flexible polymeric organic substance, it may be moved using a film advance system in the form of a succession of rollers.

The laser may also be moved so as to adjust its distance from the substrate, which may in particular be useful when the substrate is bent, but not only in such a case. Indeed, it is preferable for the laser beam to be focused onto the coating to be treated so that the latter is located at a distance of less than or equal to 1 mm from the focal plane. If the system for moving the substrate or moving the laser is not sufficiently precise as regards the distance between the substrate and the focal plane, it is preferable to be able to adjust the distance between the laser and the substrate. This adjustment may be automatic, especially regulated using a distance measurement upstream of the treatment.

When the laser line is moving, it is necessary to provide a system for moving the laser, located above or beneath the substrate. The duration of the treatment is regulated by the run speed of the laser line.

Of course, all relative positions of the substrate and the laser are possible provided that the surface of the substrate can be suitably irradiated. More generally, the substrate is placed horizontally, but it may also be placed vertically, or at any possible inclination. When the substrate is placed horizontally, the laser is generally placed so as to irradiate the top side of the substrate. The laser may also irradiate the underside of the substrate. In this case, it is necessary for the substrate support system, and optionally the substrate conveying system when the substrate is moving, to let the radiation into the zone to be irradiated. This is the case for example when conveying rollers are used. Since the rollers are separate entities, it is possible to have the laser pass into a zone located between two successive rollers.

When both sides of the substrate are to be treated, it is possible to employ a number of lasers located on either side of the substrate, whether the latter is in a horizontal, vertical or any inclined position.

The radiation device, for example the in-line laser, may be integrated into a film deposition line, for example a magnetron sputtering line or a chemical vapor deposition (CVD) line, especially a plasma-enhanced (PECVD) line, under vacuum or at atmospheric pressure (AP-PECVD). In general, the line includes substrate handling devices, a deposition unit, optical control devices and stacking devices. For example, the substrates run on conveyor rollers, in succession past each device or each unit.

The radiation device, for example the in-line laser, is preferably located just after the film deposition unit, for example at the exit of the deposition unit. The coated substrate may thus be treated in line after the film has been deposited, at the exit of the deposition unit and before the optical control devices, or after the optical control devices and before the substrate stacking devices.

The radiation device may also be integrated into the deposition unit. For example, the laser may be introduced into one of the chambers of a sputtering deposition unit, especially in a chamber in which the atmosphere is rarefied, especially at a pressure between $10^{-6}$ mbar and $10^{-2}$ mbar. The laser may also be placed outside the deposition unit, but so as to treat a substrate located inside said unit. For this purpose, all that is required is to provide a window transparent to the wavelength of the radiation used, through which the laser beam passes to treat the film. It is thus possible to treat a film (for example a silver film) before the subsequent deposition of another film in the same unit. When an absorbent film is an overcoat, for example made of metal, its oxidation during the treatment may be impeded if the substrate is placed in a vacuum chamber. It is possible in this case to treat the multilayer in a special chamber, in which the oxidizing atmosphere is controlled.

Whether the radiation device is outside the deposition unit or integrated thereinto, these "in-line" processes are preferable to a process involving off-line operations, in which it would be necessary to stack the glass substrates between the deposition step and the heat treatment.

However, processes involving off-line operations may have an advantage in cases in which the heat treatment according to the invention is carried out in a place different from that where the deposition is carried out, for example in a place where conversion of the glass takes place. The radiation device may therefore be integrated into lines other than the film deposition line. For example, it may be integrated into a multiple glazing (especially double or triple glazing) manufacturing line or into a laminated glazing manufacturing line. In these various cases, the heat treatment according to the invention is preferably carried out before the multiple glazing or laminated glazing is produced.

The multilayer may be deposited on the substrate by any type of process, in particular processes generating predominantly amorphous or nanocrystalline films, such as the sputtering, especially magnetron sputtering, process, the plasma-enhanced chemical vapor deposition (PECVD) process, the vacuum evaporation process or the sol-gel process.

Preferably, the multilayer is deposited by sputtering, especially magnetron sputtering.

For greater simplicity, the laser treatment of the film preferably takes place in air and/or at atmospheric pressure. However, it is possible for the heat treatment of the film to be carried out within the actual vacuum deposition chamber, for example before a subsequent deposition.

Preferably, the laser treatment is such that each point on the thin film is raised to a temperature of at least 300° C., while keeping any point on that face of said substrate opposite said first face at a temperature not exceeding 100° C., so as to increase the rate of crystallization of said thin film, keeping it continuous, and without a step in which said thin film melts. The thin film therefore remains continuous as a result of the treatment.

The expression "continuous thin film" is understood in the context of the present invention to mean that the film covers substantially the entire substrate or, in the case of a multilayer, the entirety of the subjacent film. It is important that the continuous character of the thin film (and therefore its advantageous properties) be preserved by the treatment according to the invention.

The expression "a point on the film" is understood to mean an area of the film undergoing the treatment at a given instant. According to the invention, the entire film (and therefore each point) is raised to a temperature of at least 300° C., but each point on the film is not necessarily treated simultaneously. The film may be treated in its entirety at the same instant, each point on the film being simultaneously raised to a temperature of at least 300° C. Alternatively, the film may be treated so that the various points on the film or groups of points are heated in succession to a temperature of at least 300° C., this second embodiment being more often employed in the case of continuous implementation on an industrial scale.

The process according to the invention may be carried out on a substrate placed either horizontally or vertically. It may also be carried out on a substrate provided with thin films on both its faces, at least one film on one of the faces or on each face being treated according to the invention. If thin films deposited on both faces of the substrate are treated according to the invention, it is possible for said thin films to be treated on each face either simultaneously or in succession, by the same or different techniques, in particular depending on whether the nature of the treated films is the same or different. Of course, the case in which the treatment according to the invention is carried out simultaneously on both faces of the substrate lies within the scope of the invention.

Another subject of the invention is the materials that can be obtained by the process according to the invention.

The subject of the invention is also in particular an untempered glass substrate coated on at least one face with a low-E thin-film multilayer comprising a single thin silver film between at least two thin dielectric films. In particular, the multilayer is such that:

the multilayer has a sheet resistance of less than or equal to 1.9 ohms, or even 1.8 ohms, and it is such that a clear glass substrate 4 mm in thickness coated with the multilayer has a light transmission greater than or equal to 75%, or even 76%, and a chromatic value a* in reflection on the multilayer side of less than or equal to 5, or even 4; or the multilayer has a sheet resistance of more than 1.9 ohms but less than or equal to 2.4 ohms, and is such that a clear glass substrate 4 mm in thickness coated with the multilayer has a light transmission of greater than or equal to 81%, or even 82%, and a chromatic value a* in reflection on the multilayer side of less than or equal to 5, or even less than or equal to 4; or the multilayer has a sheet resistance greater than 2.4 ohms but less than or equal to 3.0 ohms, and is such that a clear glass substrate 4 mm in thickness coated with the multilayer has a light transmission greater than or equal to 87%, or even 88%, and a chromatic value a* in reflection on the multilayer side of less than or equal to 4.

The physical thicknesses of the silver films are preferably between 14 and 18 nm as a first alternative, between 12 and 16 nm as a second alternative and between 10 and 14 nm as a third alternative.

The process according to the invention, by optimizing the energy transfer toward the silver film that it provides, makes it possible to obtain low-E multilayers having a combination of emissivity on the one hand and optical properties (light transmission and color) on the other which has never hitherto been able to be achieved other than by tempering.

The light transmission is calculated from a spectrum according to the NF EN 410 standard. The chromatic value a* is calculated using the CIE 1931 reference observer and illuminant $D_{65}$.

Yet another subject of the invention is an untempered glass substrate coated on at least one face with a low-E thin-film multilayer comprising at least two thin silver films between at least two thin dielectric films, such that the parameter $\Delta E^*$ between said coated substrate and the coated substrate after tempering is less than or equal to 2.0, especially 1.5. Preferably, the multilayer comprises two or three silver films.

As known in the technical field, $\Delta E^* = \sqrt{(\Delta L^*)^2 + (\Delta a^*)^2 + (\Delta b^*)^2}$. The colorimetric coordinates $L^*$, $a^*$ and $b^*$ are calculated under illuminant $D_{65}$ and using the CIE-1931 reference observer. The colorimetric coordinates are those in reflection on the substrate side, i.e. that side of the face on the opposite side from the multilayer. The term $\Delta L^*$ denotes the change in the coordinate $L^*$ between the coated substrate and the same substrate coated after tempering. The same convention applies to the terms $\Delta a^*$ and $\Delta b^*$.

As indicated above, a treatment according to the invention enables colorimetric properties to be obtained that are substantially the same as or at least very close to those obtained by a tempering treatment. If this untempered substrate is subsequently tempered, its colorimetric properties would be hardly affected by the tempering. To the knowledge of the inventors, no multilayer comprising at least two silver films has ever yet satisfied this property, called "temperability".

The multilayers according to the invention preferably have the general architecture described above. For concision and clarity, the corresponding passages are not reproduced here, but all the details about the position of the various layers, their function (first and second coating, dielectric films, overblocker films, underblocker films, wetting film, smoothing film, overcoat), their chemical nature, and their thicknesses are of course also applicable to the multilayers according to the invention.

Preferably, the coated substrates according to the invention do not include an antireflection coating on the face opposite that with the low-E thin-film multilayer.

The substrates obtained according to the invention may be used in single, multiple or laminated glazing, mirrors, and glass wall coverings. In the case of multiple glazing comprising at least two glass sheets separated by a gas-filled cavity, it is preferable for the multilayer to be placed on the face in contact with said gas-filled cavity, especially on face 2 relative to the outside (i.e. on that face of the substrate in contact with the outside of the building which is on the opposite side to the face turned toward the outside) or on face 3 (i.e. on that face of the second substrate starting from the outside of the building turned toward the outside).

The invention will be illustrated by means of the following nonlimiting examples of the implementation thereof.

EXAMPLE 1

Various low-E multilayers were deposited on a clear glass substrate 4 mm in thickness sold under the name SGG Planilux by the Applicant. All the multilayers were deposited, in a known manner, on a magnetron sputtering line, through which the substrate ran beneath various targets.

Table 1 indicates for each multilayer tested the physical thickness of the films, expressed in nm. The first row corresponds to the film furthest away from the substrate, i.e. in contact with the open air.

The absorption corresponds to the absorption of a clear glass substrate 4 mm in thickness coated with the multilayer at the wavelength of the laser radiation (808 nm).

TABLE 1

| Sample | C1 | 1 | 2 | 3 | 4 | 5 | 6 |
|---|---|---|---|---|---|---|---|
| Ti | 0 | 0 | 3 | 2 | 0 | 2 | 2 |
| ZnSnSbO$_x$ | 2 | 0 | 0 | 0 | 2 | 0 | 0 |
| Si$_3$N$_4$:Al | 0 | 0 | 0 | 0 | 20 | 0 | 0 |
| NbN | 0 | 0 | 0 | 0 | 4 | 0 | 0 |
| Si$_3$N$_4$:Al | 35 | 35 | 40 | 40 | 15 | 35 | 38 |
| ZnO:Al | 5 | 5 | 5 | 5 | 5 | 5 | 5 |
| Ti | 0.5 | 2 | 0.5 | 2 | 0.5 | 0.5 | 0.5 |
| Ag | 9.5 | 9.5 | 15 | 15 | 11 | 11 | 13.5 |
| ZnO:Al | 5 | 5 | 5 | 5 | 5 | 5 | 5 |
| TiO$_2$ | 10 | 10 | 15 | 15 | 10 | 10 | 13 |
| Si$_3$N$_4$:Al | 20 | 20 | 10 | 10 | 20 | 20 | 15 |
| Absorption(%) | 9.1 | 16.3 | 25.8 | 30.1 | 24.2 | 19.5 | 21.0 |

Table 2 below lists the deposition parameters employed for the various films.

TABLE 2

| Film | Target employed | Deposition pressure | Gas |
|---|---|---|---|
| Si$_3$N$_4$ | Si:Al with 92:8 wt % | $1.5 \times 10^{-3}$ mbar | Ar/(Ar + N$_2$) with 45% Ar |
| TiO$_2$ | TiO$_x$ with $x$ around 1.9 | $1.5 \times 10^{-3}$ mbar | Ar/(Ar + O$_2$) with 95% Ar |
| ZnSnSbO$_x$ | SnZn:Sb with 34:65:1 wt % | $2 \times 10^{-3}$ mbar | Ar/(Ar + O$_2$) with 58% Ar |
| ZnO:Al | Zn:Al with 98:2 wt % | $2 \times 10^{-3}$ mbar | Ar/(Ar + O$_2$) with 52% Ar |
| Ti | Ti | $2 \times 10^{-3}$ mbar | Ar |
| NbN | Nb | $2 \times 10^{-3}$ mbar | Ar/(Ar + N$_2$) with 40% Ar |
| Ag | Ag | $2 \times 10^{-3}$ mbar | 100% Ar |

Each of these multilayers comprises a single silver film with a thickness of 15 nm, 13.5 nm, 11 nm or 9.5 nm depending on the example. They all include a metallic titanium overblocker, a zinc oxide wetting film and two silicon nitride dielectric films. Specimen C1 is a comparative example, comprising a non-absorbent overcoat made of antimony-doped zinc tin oxide and an overblocker of conventional thickness (0.5 nm), resulting in a low absorption at the laser wavelength. Specimen 1 according to the invention comprises a thickened (2 nm) overblocker so that the absorption reaches a value of 16%. Specimens 2, 3, 5 and 6 according to the invention have a titanium metal overcoat. The overblocker of example 3 is also thickened to 2 nm. Because of the additional titanium thicknesses from these modifications, the absorption of the coated substrate reaches values of 20 to 30% in these examples. Specimen 3 itself comprises a niobium nitride absorbent film, which allows an absorption of 24% to be achieved. This multilayer fulfills both a low-E function and a solar control function.

These various specimens were treated using an in-line laser emitting radiation with a wavelength of 808 nm, past which the coated substrate runs translationally.

Table 3 below indicates:

the run speed, in meters per minute;

the sheet resistance denoted by R$_o$ and expressed in ohms, before and after laser treatment;

the relative reduction in sheet resistance due to the treatment, denoted by ΔR$_o$ and expressed as a percent;

the normal emissivity at the temperature of 283 K, calculated according to the EN 12898 standard using a spectrum in reflection in the spectral range from 5 to 50 microns, denoted by ∈$_n$ and expressed in percent, before and after laser treatment;

the relative reduction in the normal emissivity due to the treatment, denoted by Δ∈$_n$ and expressed in percent;

the light transmission and energy transmission of the specimen, according to the NF EN 410 standard, before and after laser treatment; and the chromatic value a* in reflection on the multilayer side, calculated using the CIE 1931 reference observer and under illuminant D$_{65}$.

TABLE 3

| | Specimen | | | | | | | | |
|---|---|---|---|---|---|---|---|---|---|
| | C1 | C1 | 1 | 1 | 2 | 3 | 4 | 5 | 6 |
| Speed (m/min) | 10 | 4 | 10 | 4 | 8 | 10 | 10 | 8 | 8 |
| $R_o$ before ($\Omega$) | 4.70 | 4.70 | 4.82 | 4.82 | 2.20 | 2.20 | 3.67 | 3.70 | 2.72 |
| $R_o$ after ($\Omega$) | 4.65 | 4.51 | 4.10 | 3.75 | 1.72 | 1.67 | 2.97 | 2.84 | 2.12 |
| $\Delta R_o$ (%) | 1.1 | 4.2 | 15 | 22 | 22 | 24 | 19 | 23 | 22 |
| $\epsilon_n$ before (%) | 5.2 | 5.2 | 5.3 | 5.3 | 2.4 | 2.4 | 4.0 | 4.0 | 3.0 |
| $\epsilon_n$ after (%) | 5.2 | 5.0 | 4.5 | 4.1 | 1.8 | 1.8 | 3.2 | 3.1 | 2.3 |
| $\Delta\epsilon_n$ (%) | 0 | 3.8 | 15 | 23 | 25 | 25 | 20 | 22 | 23 |
| $T_L$ before (%) | 89.0 | 89.0 | 81.8 | 81.8 | 57.0 | 57.1 | 64.3 | 76.5 | 71.5 |
| $T_L$ after (%) | 89.0 | 89.1 | 88.9 | 89.2 | 65.4 | 76.5 | 65.1 | 88.0 | 83.2 |
| a* after | 1.5 | 1.5 | 2.3 | 2.6 | 3.3 | 3.2 | −2.2 | 2.5 | 2.8 |
| $T_E$ before (%) | 67.2 | 67.2 | 58.4 | 58.4 | 40.1 | 38.3 | 45.9 | 50.5 | 46.4 |
| $T_E$ after (%) | 67.2 | 67.3 | 67.1 | 66.5 | 47.2 | 47.3 | 46.1 | 61.3 | 57.1 |

The specimens according to the invention, after laser treatment, experience a drop in sheet resistance and in emissivity of at least 15%, or even 20%, in the case of the most absorbent specimens before treatment, which testifies to the substantial improvement in the crystallization of the silver films, especially an increase in the size of the crystalline silver grains. A reduction in the treatment speed allows the sheet resistance and emissivity values to be lowered even further.

In the case of specimens 1 to 3 and 5 to 6, the light transmission, which was low before treatment since the multilayer was absorbent, greatly increases until reaching, for the same silver thickness, a value comparable to that of specimen C1, which is barely absorbent before treatment. This increase in the light transmission results in the oxidation of the titanium during the treatment. However, the light transmission of specimen 4 changes little during the laser treatment, probably because the silicon nitride film deposited on top of the niobium nitride film protects the latter from oxidation.

In comparison, specimen C1, when it is treated at the same speed, experiences only a minimal drop in sheet resistance. A reduction in the treatment speed to 4 meters per minute is still insufficient in terms of reducing the sheet resistance and the emissivity. By adapting the multilayer, it is therefore possible for the treatment to be considerably accelerated and for much superior performance to be obtained for the same treatment speed.

These examples also show that the process according to the invention makes it possible to obtain multilayers on untempered glass that combine:
- a sheet resistance of less than or equal to 1.9 ohms, a light transmission greater than or equal to 75% and a chromatic value a* of less than or equal to 5, which is the case in examples 2 and 3;
- a sheet resistance of less than or equal to 2.4 ohms, a light transmission of greater than or equal to 81% and a chromatic value a* of less than or equal to 5, which is the case in example 6;
- a sheet resistance of less than or equal to 3.0 ohms, a light transmission greater than or equal to 87% and a chromatic value a* of less than or equal to 4, which is the case in example 5.

Specimen 2 also underwent a tempering operation, either after laser treatment or directly after the deposition (and therefore with no laser treatment).

Table 4 below indicates the light transmission (according to the NF EN 410 standard) and the colorimetric coordinates in reflection on the multilayer side (under illuminant $D_{55}$ and with the CIE-1931 reference observer) before laser treatment, after laser treatment, after laser treatment followed by tempering and after tempering (with no laser treatment). Table 4 also indicates the changes in colorimetry of the specimen caused by the laser treatment or the tempering. These changes are expressed by the parameter $\Delta E^*$ defined above. The specimen before laser treatment is compared with the treated specimen (to show the effect of the laser treatment) and with the tempered specimen (to show the effect of the tempering), and the specimen after laser treatment is compared with the tempered specimen (but not laser-treated: comparison between effects of the laser treatment and the effects of the tempering) and the specimen after laser treatment is compared with the laser-treated and then tempered specimen.

TABLE 4

| Before laser | TL | 65.4 | | |
| --- | --- | --- | --- | --- |
| | L* | 42.8 | | |
| | a* | 6.3 | | |
| | b* | −11.5 | | |
| After laser | TL | 76.5 | | |
| | L* | 46.4 | $\Delta E^*$ before/after laser | 6.9 |
| | a* | 3.3 | | |
| | b* | −6.5 | | |
| After laser followed by tempering | TL | 76.9 | | |
| | L* | 46.7 | $\Delta E^*$ after laser/after laser followed by tempering | 0.8 |
| | a* | 3.4 | | |
| | b* | −5.8 | | |
| After tempering | TL | 76.7 | | |
| | L* | 46.7 | $\Delta E^*$ before/after tempering | 7.3 |
| | a* | 3.4 | | |
| | b* | −6.1 | | |
| | | | $\Delta E^*$ after laser/after tempering | 0.5 |

It is apparent from Table 4 that the colorimetric coordinates of a substrate treated according to the invention are very close to those of a tempered substrate. Likewise, the colorimetric coordinates of a treated substrate according to the invention are very close to those of a substrate treated according to the invention and then tempered. The treatment according to the invention therefore makes it possible to obtain an untempered substrate, the multilayer of which is always temperable in the sense that its colorimetric properties are not substantially modified by the tempering. It is therefore possible to combine on one and the same wall untempered and tempered substrates.

EXAMPLE 2

In this example, multilayers comprising two or three silver films deposited on the same substrate as that used for example 1 were treated according to the invention.

Table 5 indicates the physical thickness of the films, expressed in nm, for each multilayer tested. The first row corresponds to the film furthest away from the substrate, in contact with the open air.

TABLE 5

| Specimen | 7 | 8 | 9 |
|---|---|---|---|
| ZnSnOx | 0 | 0 | 2 |
| $Si_3N_4$:Al | 0 | 0 | 20 |
| ZnO:Al | 0 | 0 | 5 |
| Ti | 0 | 0 | 0.5 |
| Ag | 0 | 0 | 17 |
| ZnO:Al | 0 | 0 | 5 |
| ZnSnOx | 2 | 0 | 0 |
| $Si_3N_4$:Al | 15 | 35 | 60 |
| ZnO:Al | 5 | 5 | 5 |
| Ti | 1 | 0 | 0.5 |
| NiCr | 0 | 1 | 0 |
| Ag | 15 | 14 | 13 |
| ZnO:Al | 5 | 5 | 5 |
| NbN | 0 | 1.5 | 0 |
| $Si_3N_4$:Al | 60 | 70 | 60 |
| ZnO:Al | 5 | 5 | 5 |
| Ti | 1.5 | 0 | 0.5 |
| NiCr | 0 | 1.2 | 0 |
| Ag | 9 | 8.5 | 9 |
| NiCr | 0 | 3.5 | 0 |
| ZnO:Al | 5 | 5 | 5 |
| $Si_3N_4$:Al | 25 | 15 | 30 |
| Absorption(%) | 21.9 | 36.4 | 19.1 |

Specimens 7 and 8 are multilayers comprising two silver films. Specimen 8 comprises nickel-chromium alloy blockers and a niobium nitride absorbent film, so that the absorption thereof is higher than that of example 7. Specimen 9 comprises three silver films.

These various specimens were treated using an in-line laser emitting radiation with a wavelength of 808 nm, past which the coated substrate runs translationally. The specimens were then tempered using techniques known to those skilled in the art.

Tables 6 and 7 below indicate:
the run speed, in meters per minute;
the sheet resistance denoted by $R_o$ and expressed in ohms, before and after laser treatment;
the relative reduction in sheet resistance due to the treatment, denoted by $\Delta R_o$ and expressed as a percent;
the normal emissivity at the temperature 283 K, calculated according to the EN 12898 standard using a spectrum in reflection within the spectral range from 5 to 50 microns, denoted by $\epsilon_n$ and expressed in percent, before and after laser treatment;
the relative reduction in the normal emissivity due to the treatment, denoted by $\Delta\epsilon_n$ and expressed in percent;
the light transmission of the specimen, according to the NF EN 410 standard, before laser treatment, after laser treatment, after laser treatment followed by tempering, or after tempering alone (with no laser treatment);
the energy transmission according to the NF EN 410 standard, before and after laser treatment;
the chromatic values L*, a*, b* in reflection on the same side as the face opposite the multilayer (i.e. the substrate side), these being calculated using the CIE 1931 reference observer and under illuminant $D_{65}$, before laser treatment, after laser treatment, after laser treatment followed by tempering, or after tempering alone (with no laser treatment);
the solar factor calculated according to the NF EN 410 standard for double glazing comprising two clear glass substrates 6 mm in thickness flanking a 15 mm thick cavity containing 90% argon, in which a multilayer is on face 2, i.e. on that face of the substrate in contact with the outside of the building, which is opposite the face turned toward the outside (the latter being termed face 1); and
the selectivity, which is the ratio of the light transmission calculated according to the NF EN 410 standard to the solar factor. In this case, the light transmission is that of the double glazing employed for calculating the solar factor.

TABLE 6

| Specimen | 7 | 8 | 9 |
|---|---|---|---|
| Speed (m/min) | 15 | 18 | 14 |
| $R_o$ before (Ω) | 2.44 | 2.60 | 1.31 |
| $R_o$ after (Ω) | 1.86 | 1.96 | 1.05 |
| $\Delta R_o$ (%) | 24 | 25 | 20 |
| $\epsilon_n$ before (%) | 2.7 | 2.9 | 2.2 |
| $\epsilon_n$ after (%) | 2.1 | 2.2 | 1.8 |
| $\Delta\epsilon_n$ after (%) | 22 | 24 | 18 |
| $T_E$ before (%) | 36.9 | 19.4 | 29.8 |
| $T_E$ after (%) | 39.2 | 22.2 | 32.3 |
| Solar factor before | 35.0 | 20.6 | 28.7 |
| Solar factor after | 36.8 | 22.9 | 30.8 |
| Selectivity before | 1.72 | 1.60 | 2.02 |
| Selectivity after | 1.75 | 1.74 | 2.06 |

In the case of these multilayers having two or three silver films, by having many blockers it is possible to obtain high absorptions at the wavelength of the laser and therefore a substantial reduction in the sheet resistance and in the emissivity. The selectivity of the multilayers obtained increases in relative terms by more than 1%, or even more than 2%.

Table 7 serves to compare the colorimetric coordinates in reflection on the substrate side of the specimens before laser treatment, after laser treatment, after laser treatment followed by tempering, and after tempering (with no laser treatment).

TABLE 7

| Specimen | 7 | 8 | 9 |
|---|---|---|---|
| $T_L$ before (%) | 68.3 | 36.5 | 64.4 |
| $T_L$ after laser (%) | 72.9 | 44.2 | 70.2 |
| $T_L$ after laser followed by tempering (%) | 73.1 | 44.7 | 71.4 |
| $T_L$ after tempering (%) | 73.3 | 44.6 | 71.5 |
| L* before laser | 42.1 | 50.3 | 32.5 |
| L* after laser | 42.6 | 51.0 | 34.1 |
| L* after laser followed by tempering | 43.0 | 51.0 | 35.1 |
| L* after tempering | 42.9 | 51.0 | 35.0 |
| a* before laser | −0.4 | −1.8 | −0.5 |
| a* after laser | 1.6 | −4.5 | −0.7 |
| a* after laser followed by tempering | 1.8 | −5.6 | −0.9 |
| a* after tempering | 1.7 | −5.5 | −0.9 |

TABLE 7-continued

| Specimen | 7 | 8 | 9 |
|---|---|---|---|
| b* before laser | −14.2 | −8.1 | −7.4 |
| b* after laser | −13.8 | −6.5 | −6.6 |
| b* after laser followed by tempering | −13.0 | −6.1 | −5.8 |
| b* after tempering | −13.2 | −6.1 | −6.0 |

The ΔE* values are as follows: for specimen 7, it is 0.9 between the laser-treated specimen and the specimen laser-treated and then tempered, and 0.7 between the laser-treated specimen and the tempered specimen (with no laser treatment) respectively; for specimen 8, these values are 1.2 and 1.1 respectively; and for specimen 9, these values are 1.3 and 1.1 respectively. It is therefore possible to combine on one and the same wall substrates treated according to the invention (untempered), substrates that are only tempered and substrates treated according to the invention and then tempered.

EXAMPLE 3

Various low-E multilayers were deposited on a clear glass substrate 4 mm in thickness sold under the name SGG Planilux by the Applicant. All the multilayers were deposited, in a known manner, on a magnetron sputtering line, through which the substrate ran beneath various targets.

The following were deposited on a multilayer of the substrate/$Si_3N_4$/ZnO/Ag/NiCr/ZnO/$Si_3N_4$ type: a titanium absorbent film about 3 nm in thickness in the case of specimen 10; and a titanium absorbent film 1.5 nm in thickness surmounted by a carbon film about 2 nm in thickness in the case of specimen 11.

The absorption, corresponding to the absorption of a clear glass substrate 4 mm in thickness coated with the multilayer at the wavelength of the laser radiation (in this example, 980 nm), was 15.3% in the case of specimen 10 and 19.4% in the case of specimen 11.

The carbon film was obtained by sputtering using a graphite target in an argon atmosphere. Having this carbon film present enables the absorption of the laser radiation to be further increased.

These various specimens were treated with an in-line laser emitting radiation at a wavelength of 980 nm, past which the coated substrate ran translationally.

Table 8 below indicates:
the run speed, in meters per minute;
the sheet resistance, denoted by $R_o$ and expressed in ohms, before and after laser treatment;
the relative reduction in sheet resistance due to the treatment, denoted by $\Delta R_o$ and expressed as a percent; and
the light transmission of the specimen according to the NF EN 410 standard, before and after laser treatment.

TABLE 8

| Specimen | 10 | 10 | 11 | 11 |
|---|---|---|---|---|
| Speed (m/min) | 13 | 16 | 20 | 21 |
| $R_o$ before (Ω) | 5.0 | 5.0 | 4.9 | 4.9 |
| $R_o$ after (Ω) | 4.2 | 4.5 | 4.1 | 4.3 |
| $\Delta R_o$ (%) | −16.3 | −10.3 | −16.5 | −11.5 |
| $T_L$ before (%) | 80.8 | 80.8 | 76.8 | 76.8 |
| $T_L$ after (%) | 84.1 | 83.0 | 79.4 | 79.5 |

These results show that the carbon overcoat makes it possible to increase the run speed considerably.

The invention claimed is:

1. A process for producing a substrate with a low emissivity (low-E) thin-film multilayer, the process comprising:
   (a) depositing a thin-film multilayer comprising a thin silver film between at least two thin dielectric films and an absorbent thin film on a face of a substrate, to obtain a coated face; and
   (b) heat treating the coated face with a source of laser radiation which emits a wavelength between 800 and 2000 nm, to obtain a treated face,
   wherein the heat treating reduces by at least 5% at least one selected from the group consisting of an emissivity and a sheet resistance of the multilayer,
   wherein the absorbent thin film absorbs the laser radiation during the heat treating,
   wherein the absorbent thin film is in contact with the air, and comprises:
   a metal;
   an oxygen-substoichiometric metal oxide; or
   a metal nitride selected from the group consisting of niobium nitride and titanium nitride, and
   wherein the absorbent thin film has a thickness less than 5 nm.

2. The process of claim 1, wherein, during the heat treating, a temperature of a second face of the substrate on an opposite side from the treated face does not exceed 100° C.

3. The process of claim 1, wherein the heat treating reduces by at least 15% or 20% at least one selected from the group consisting of the sheet resistance and the emissivity of the multilayer.

4. The process of claim 1, wherein the multilayer comprises at least two silver films.

5. The process of claim 1, wherein the substrate comprises glass or a polymeric organic substance.

6. The process of claim 1, wherein the absorbent thin film is a metallic film.

7. The process of claim 1, wherein the absorbent thin film is a metal nitride film selected from the group consisting of niobium nitride and titanium nitride.

8. The process of claim 1, wherein the absorbent thin film is an oxygen-substoichiometric metal oxide film.

9. The process of claim 1, wherein a surface power of the laser radiation on the multilayer is equal to or greater than 20 kW/cm$^2$.

10. The process of claim 1, wherein the laser radiation is emitted by a laser beam forming a line which simultaneously irradiates all or a part of a width of the substrate.

11. The process of claim 10, further comprising, during the heat treating, relatively moving the substrate and the laser line, wherein a difference between a respective speed of the substrate and the laser is greater than or equal to 4 meters per minute.

12. The process of claim 1, wherein the wavelength of the laser radiation is between 800 and 1000 nm.

13. The process of claim 1, wherein the depositing is carried out by magnetron sputtering.

14. The process of claim 1, further comprising, after the heat treating, tempering the substrate.

15. The process of claim 1, wherein the heat treating reduces by at least 20% at least one selected from the group consisting of the sheet resistance and the emissivity of the multilayer.

16. The process of claim 1, wherein the heat treating is not a bending or tempering treatment.

* * * * *